May 20, 1969  E. M. GUYER  3,445,616
ELECTRIC FLAME GENERATOR
Filed Dec. 6, 1966
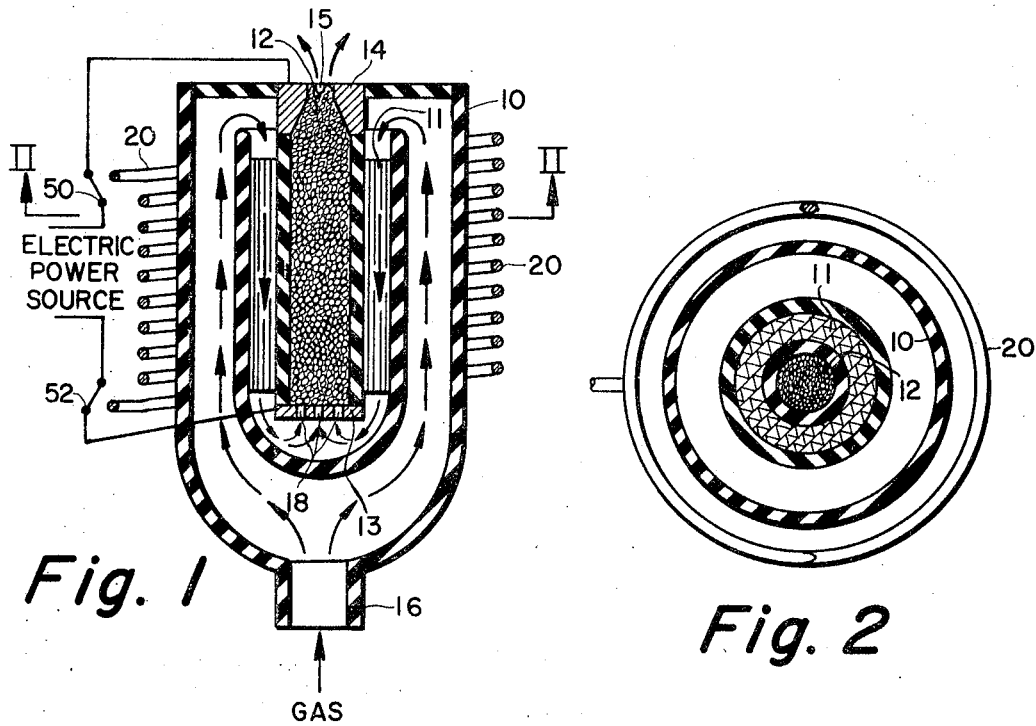
Fig. 1
Fig. 2
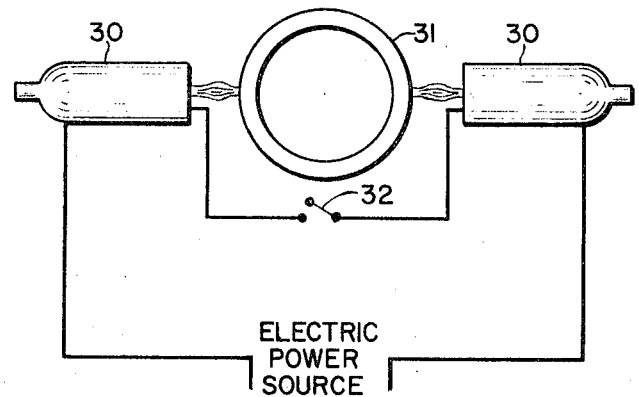
Fig. 3
*INVENTOR.*
EDWIN M. GUYER
BY *William D. Fosdick*
AGENT United States Patent Office 3,445,616
Patented May 20, 1969

3,445,616
ELECTRIC FLAME GENERATOR
Edwin M. Guyer, Corning, N.Y., assignor to Corning Glass Works, Corning, N.Y., a corporation of New York
Filed Dec. 6, 1966, Ser. No. 599,538
Int. Cl. H05b 5/18, 5/08
U.S. Cl. 219—10.51
8 Claims

ABSTRACT OF THE DISCLOSURE

An electric flame generator in which a gas is passed through a porous material. The material is heated by electrical conduction or induction to a temperature sufficient to render the gas electrically conductive as it passes through the material. After the gas has been elevated to such temperature an electric current is passed through the gas further to elevate its temperature to render it useful for such purposes as melting glasses and ceramics.

---

This invention relates to electric heaters, and more particularly to a gaseous conductor electric flame generator.

It is an object of the present invention to provide a heating means useful for such purposes as melting glasses, ceramics, refractories and metals, which means is free from the disadvantages generally associated with conventional heating means, such as gas burners and conventional electric arcs.

The heating means of the present invention comprises a porous material, means for passing a gas or other fluid through the interstices of the porous material, means for heating the porous material and means for passing an electrical current through the gas after it has been heated by its contact with the heated porous material.

The specific objects of the present invention and its advantagges over conventional heating means will be stated as part of the detailed description of the invention provided with reference to the accompanying drawings, in which:

FIGURE 1 is a schematic sectional view through an electric flame generator according to the invention, FIGURE 2 is a sectional view taken on line 2—2 of FIGURE 1, and FIGURE 3 is a schematic view illustrating the use of two series-connected flame generators for supplying heat to an area about the circumference of a section of glass tubing.

Referring to FIGURE 1, the electric flame generator of the invention comprises an electrically insulating housing 10 having an inlet 16 for the passage of gas into the housing. Within the housing is a porous electrically insulating heat regenerating material 11, which may be, for example, boron nitride granules, through which gas entering the housing passes before circulating through porous electrically conducting material 12. Electrodes 13 and 14 contact material 12 and are connected to a suitable source of electric power, as illustrated.

As indicated by the arrows, during operation of the device, gas entering the housing travels upwardly in the space between the housing and heat regenerator 11, through the heat regenerator downwardly to the base of electrically conducting porous material 12, through apertures 18 in electrode 13, through porous material 12 and emerges from the outlet in the form of a superelectrical current, applied across porous material 12, heats this material. As the gas passes through the material, it is itself heated by contact with the heated surface of the material and, prior to reaching outlet 15, is heated sufficiently to become itself an electrically conducting medium. Due to the subsequent passage of electrical current through the gas, the gas is heated to a temperature substantially higher than that of material 12 and emerges from the outlet in the form of a superheated gas.

Conductive material 12 may comprise spheroidized carbon or graphite particles approximately ⅛ inch in diameter, or, alternatively, the carbon or graphite can be in the form of stacked discs or blocks with suitably formed duct patterns providing a porous structure. Other high temperature conductors which can be utilized in suitable form include tungsten, molybdenum, silicon carbide, boron carbide and other conducting carbides, borides and oxides. Suitable gases which may be employed in the device are argon, neon, helium and nitrogen. Where desirable, materials such as alkali salts or ores containing caesium or other low "work function" materials can be added to a granular conductor bed to increase the electrical conductivity of the hot gases generated in the electric flame.

Means other than electric conduction heating of the porous conductor material may be utilized. Induction heating of the porous conducting material may be effected by means of inductor coil 20 to which power may be directed by means of switches 50 and 52. An advantage accruing from inducting heating of the porous conductor is the fact that by the inclusion of ferromagnetic metallic or ceramic particles, such as magnetite ($Fe_3O_4$), in the conductor matrix, a significant degree of temperature regulation can be achieved by virtue of the changes in magnetic flux concentration in the material as the ferromagnetic particles are heated to their Curie temperatures and become non-magnetic until the gas flow cools them again.

In a preferred embodiment of the invention, electrically conducting material 12 may comprise graphite spheres ⅛ inch in diameter. The particles may be retained in the form of a cylinder 1 foot in diameter and 4 feet in length An electric field of 1000 volts alternating at a frequency of 5000 cycles per second may be applied between electrodes 13 and 14. When argon is caused to flow through the conducting material at a rate of 10,000 cubic feet per hour, the described arrangement will cause the emergent gas to be heated to approximately 3000° C.

Several means for temperature control of the porous conducting material and the emergent gas are possible. While the temperatures of electric flame generators according to the invention can be controlled by external regulation of the electric power supply, it is also possible to control temperature by internal variation of the electrical characteristics of the conducting material. Parameters which determine the effective resistance of the material are gas flow velocity and direction, which control the degree of contact between the particles in a particulate bed as well as the heat transfer between the particles and the gas, mechanical pressure on the bed and the presence and positions of conducting refractory rods which may be inserted in the bed to bypass selected particle zones.

The gas flow which controls the electrical resistance of the porous material can be regulated by auxiliary valves in the gas line or by changes in porosity. Either or both actions can be effected by manual control or by automatic control by way of feedback of current, voltage, gas flow or gas pressure components from the electric flame generator system to an appropriate regulatory device.

Another method of controlling heating rate by variation of the resistance of a particulate conductor bed is by the mixing of measured amounts of a carbon-containing gas with the heat transfer gas. This results in pyrolysis and the deposition of pyrolytic carbon at the zones of contact between the spheroidal particles, bringing about a significant decrease in the resistance of the particulate bed. Conversely, air or oxygen passed through the particulate bed removes this carbon by oxidation and thereby increases the electrical resistance of the material.

Alternating current power at conventional frequencies, for example between 60 and 10,000 cycles per second, is suitable for the operation of electric flame generators according to the invention. Voltages will vary, and can be determined by those skilled in the art to match the various load impedance requirements of such devices. Power can be supplied by either constant voltage or constant current systems.

Power at high frequencies can be used with either continuous waves, damped waves or pulsed power. When stored energy periodic power pulses are used, the heat transfer gas flow can be pulsed out of phase with the electric pulses, making possible the use of very small particles with very high heat transfer areas. These particles form a very dense, compact mass which is readily heated by electric conduction or induction each time the gas flow is stopped. Pulses of gas flow applied between the electric heating pulses fluidize the particulate bed, creating turbulence and a very large heat transfer area.

In view of the above-mentioned control methods, in its preferred embodiment, the present device utilizes porous conductors in the form of discrete particles.

By grading the electrical resistivity of the porous material along the path of gas flow from values less than the gas resistivity to values greater than the hot gas resistivity, the heating current can be transferred gradually from the conducting particles to the hot conducting gas. By this method the conditions of high-voltage gradient close to the solid electrodes of conventional electric arcs which result in high ablation rate and frequently lead to instability, can be avoided in the present device.

One possible application of electric flame generators according to the present invention is illustrated in FIGURE 3. Here, two flame generators 30 are connected in series, and the flames produced thereby are directed against the outer surfaces of a rotating section of glass tubing 31. By means of this arrangement, when a glass cylinder is heated to its conduction temperature, the switch 32 may be opened and the circuit will then be transferred through the hot glass, heating an annular stripe around the glass. Such arrangement may be utilized for either beading the end of a glass tube or for cutting glass tubing.

Electric flame generators according to the present invention exhibit substantial advantages over conventional gas burners. Among these advantages are higher temperatures, freedom from products of combustion, freedom from requirements of critical jet velocity to prevent blowout or backfire, more precise control of flame temperature and more uniform temperature patterns over larger areas.

Flame generators according to the invention can also be utilized for many operations now preformed by conventional electric arcs and plasma-jet arcs. Among the advantages of electric flame generators over such arcs are the following:

Relatively large volumes of incandescent gas can be distributed in a controlled manner over relatively large areas. In electric arcs, by contrast, extremely high temperatures are achieved by extremely high energy concentration by thermal and magnetic "pinch effects." In order to heat larger areas, large quantities cooler gas must be mixed with the arc discharge and redirected against the surface to be heated. Any momentary irregularity in this mixing process can result in irregular heating of the article and damage to the electrode system.

Because of their freedom from extreme current concentrations in the high energy density spots characteristic of conventional electric arcs, electric resistance heated flame generators according to the invention are much less destructive of their electrodes and enclosures than are conventional electric arcs.

Since there is no critical balance between stabilizing gas velocity, current and voltage in the gas and electrode ablation, as is the case in plasma-jet arcs, the present unconstricted gaseous conductors and their porous resistors can operate with a much wider range of controlling parameters, making possible plasma flame generation in shapes which fit the configurations of various articles.

Because regenerative cooling of the container shell is possible by means of the incoming gas, operation can be made more efficient, and less costly than in plasma-jet arcs, in which commonly 40%–60% of the energy applied to the arc is transferred into the electrode cooling water because of the highly concentrated energy density at the arc electrodes. The heat generated in the porous conductor of the present device is not wasted but is added to the electric flame, and the electric heating of the gas is stabilized by the series-connected porous conductor, which serves a ballast resistor.

In addition, very reliable operation is achieved with the present device, since the porous conducting medium comprises in effect a large number of discrete conductors connected in series and in parallel, the effect being to eliminate the dependence on a single conducting strand between one pair of the electrodes.

For work at temperatures above 4000° C. the arrangement of flame generators illustrated in FIGURE 3 is utilized. By designing each unit with relatively low electrical resistance in comparison with the flame resistance, high flame temperatures can be achieved in the flame beyond the porous conductor and its refractory container. Because the gaseous conductor flame is generated independently of the electrode voltage drop, it is free from destructive ion-forming processes at the surfaces of the electrodes and does not require transformation of solid electrode material to arc plasma.

For special applications, such as heating oxidizing gases to high temperatures, where relatively high resistivity porous materials are desired, oxide refractories, such as $MgO$, $Al_2O_3$, or their mixture in a spinel, can be utilized and can be heated by dielectric loss in high voltage high frequency electrical fields. Air or oxygen can be heated to very high temperatures in such porous dielectric materials without destruction of the porous oxides. For example, when the porous oxide comprises $MgO$, a voltage of 5 kv. alternating at a frequency of 20 megacycles, may be used to effect dielectric loss heating. High dielectric constant ceramics with suitable temperature characteristics may be included in such high dielectric loss materials in order to effect temperature regulation similar to that provided by ferromagnetic materials in the induction heated unit previously described.

From the foregoing, it will be apparent that the present invention is not limited to the embodiments described as illustrative thereof, but that the invention encompasses means and methods for effecting electrical heating of a porous material, passing a gas through the porous material in order to transfer thereto an amount of heat sufficient to raise the gas to a temperature at which it becomes electrically conducting and producing an electrical current in the heated gas in order further to raise its temperature. When the term "electrical heating" is used herein, it is intended to include, but not to be limited to, the means and mehods disclosed for producing heat in the porous material of the present device. Accordingly, it is intended that the scope of the present invention be limited only by the scope of the appended claims.

I claim:
1. Means for producing a heated gaseous discharge, said means comprising:
   a porous body capable of being electrically heated,
   means for passing a gas through said porous body to heat said gas by contact with said body, means for electrically heating said porous body to a temperature sufficient to transfer to said gas as it passes through said porous body sufficient heat to raise the temperature of said gas to a temperature at which it is electrically conducting, and means for producing an electric current in said gas after it has been raised to said temperature at which it is electrically conducting.

2. Means according to claim 1 in which said porous body comprises a plurality of particles having therebetween a continuous network of interstitial space permitting passage of gas therethrough.

3. Means according to claim 1 in which said means for electrically heating said porous body comprises two electrodes respectively spaced on opposite sides of said porous body and means for applying an electric potential across said electrodes.

4. Means according to claim 1 in which said means for electrically heating said porous body comprises means for effecting an induced electric current in said body.

5. The method of producing a heated gaseous discharge, which method comprises the steps of:
electrically heating a porous material,
passing a gas through said porous material at a rate such as to cause said gas to be heated to a temperature at which it becomes electrically conducting, and
passing an electric current through said gas after it has been heated to said temperature in order further to raise its temperature.

6. An electric flame generator comprising
an electrically insulating housing,
an inlet for the passage of gas into said housing,
an outlet for said housing comprising a porous electrically insulating heat regenerating material,
said outlet communicating with a body of porous electrically conducting material and being in close proximity therewith so as to permit the transfer of heat therebetween,
said body of porous electrically conducting material having an outlet for the passage of gas from said electric flame generator, and
means for heating said porous electrically conducting material to a temperature at which it can impart to gas passing therethrough sufficient heat to render said gas electrically conducting.

7. An electric flame generator according to claim 6 in which said means for heating said body of porous material comprises means for passing an electric current therethrough.

8. An electric flame generator according to claim 6 in which said means for heating said body of porous material comprises an induction heating coil.

References Cited

UNITED STATES PATENTS

| | | | |
|---|---|---|---|
| 2,644,881 | 7/1953 | Schörg | 219—10.51 |
| 3,277,265 | 10/1966 | Reboux | 219—10.65 X |

FOREIGN PATENTS

| | | |
|---|---|---|
| 605,589 | 7/1948 | Great Britain. |

RICHARD M. WOOD, *Primary Examiner.*

L. H. BENDER, *Assistant Examiner.*

U.S. Cl. X.R.

219—10.65, 121

PO-1050
(5/69)

UNITED STATES PATENT OFFICE
CERTIFICATE OF CORRECTION

Patent No. 3,445,616        Dated May 20, 1969

Inventor(s) Edwin M. Guyer

It is certified that error appears in the above-identified patent and that said Letters Patent are hereby corrected as shown below:

Column 1, line 38, "advantagges" should be --advantages--; Column 1, lines 67 and 68, "12 and emerges from the outlet in the form of a super-electrical current, applied across porous material 12, heats" should be --12 and finally emerges from orifice 15. An alternating electrical current, applied across porous material 12, heats--.

SIGNED AND SEALED
MAY 12 1970

(SEAL)
Attest:

Edward M. Fletcher, Jr.
Attesting Officer

WILLIAM E. SCHUYLER, JR.
Commissioner of Patents